United States Patent
Abdel-Naby

(10) Patent No.: US 12,180,100 B2
(45) Date of Patent: *Dec. 31, 2024

(54) WATER TREATMENT METHOD FOR ADSORBING METAL IONS

(71) Applicant: Imam Abdulrahman Bin Faisal University, Dammam (SA)

(72) Inventor: Abir Said Ibrahim Abdel-Naby, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,193

(22) Filed: Jul. 10, 2024

(65) Prior Publication Data

US 2024/0360015 A1 Oct. 31, 2024

Related U.S. Application Data

(60) Continuation of application No. 18/316,468, filed on May 12, 2023, now Pat. No. 12,091,337, which is a
(Continued)

(51) Int. Cl.
*C02F 1/62* (2023.01)
*C02F 1/68* (2023.01)
(Continued)

(52) U.S. Cl.
CPC ............ *C02F 1/62* (2013.01); *C02F 1/683* (2013.01); *C08L 5/08* (2013.01); *B82Y 30/00* (2013.01);
(Continued)

(58) Field of Classification Search
CPC ........ C02F 1/62; C02F 1/683; C02F 2101/20; C02F 2305/08; C02F 1/288; C08L 5/08; B82Y 30/00; C08B 37/003
See application file for complete search history.

(56) References Cited

U.S. PATENT DOCUMENTS 10,913,021 B2  2/2021  Xia et al.
2018/0085736 A1* 3/2018  Kuhn .................. B01J 20/3272

FOREIGN PATENT DOCUMENTS

CN   105854789 A   8/2016
CN   108117116 A   6/2018
CN   110385111 A   10/2019

OTHER PUBLICATIONS

Donmez, et al. ; Removal of metal ions from aqueous solutions by chitosan-g-itaconic acid/hydrophilic nanoclay Nanocomposites ; Main Group Chemistry, vol. 16, No. 2; pp. 111-124 ; Jun. 24, 2017 ; Abstract Only.

(Continued)

*Primary Examiner* — Pranav N Patel

(74) *Attorney, Agent, or Firm* — Oblon, McClelland, Maier & Neustadt, L.L.P.

(57) ABSTRACT

A method of removing a metal ion from water is disclosed. The method includes treating the water with a nanocomposite to absorb the metal ion with the nanocomposite, forming a polymer-metal ion composite and removing the polymer-metal ion composite from the water. The nanocomposite includes aluminum oxide dispersed in a matrix of an uncrosslinked graft copolymer that includes a chitosan backbone and side chains of poly (itaconic acid) grafted to the chitosan backbone. The chitosan backbone has a plurality of amino groups that are acetylated by itaconic acid.

15 Claims, 13 Drawing Sheets

Related U.S. Application Data division of application No. 17/409,332, filed on Aug. 23, 2021.

(51) Int. Cl.
  *C08L 5/08* (2006.01)
  *B82Y 30/00* (2011.01)
  *C02F 101/20* (2006.01)

(52) U.S. Cl.
  CPC ...... *C02F 2101/20* (2013.01); *C02F 2305/08* (2013.01)

(56) References Cited

OTHER PUBLICATIONS

Bal, et al. ; Study on adsorption, regeneration, and reuse of crosslinked chitosan graft copolymers for Cu(II) ion removal from aqueous solutions ; Desalination and Water Treatment ; Jun. 19, 2013 ; 11 Pages.

Kyzas, et al. ; Poly(Itaconic acid)-Grafted Chitosan Adsorbents withDifferent Cross-Linking for Pb(II) and Cd(II) Uptake ; Langmuir 30, 1 ; pp. 120-131 ; Sep. 9, 2013.

\* cited by examiner

WATER TREATMENT METHOD FOR ADSORBING METAL IONS

CROSS-REFERENCE TO RELATED APPLICATIONS

The present application is a Continuation of U.S. application Ser. No. 18/316,468, now allowed, having a filing date of May 12, 2023 which is a Division of U.S. application Ser. No. 17/409,332, pending, having a filing date of Aug. 23, 2021.

BACKGROUND OF THE INVENTION

Technical Field

The present disclosure is directed to methods of water treatment using nanocomposites. More specifically, the present disclosure relates to a method of water treatment using chitosan-graft-itaconic acid-aluminum oxide nanocomposites.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Fresh drinking water is essential for human survival as the human body uses water for performing various vital functions. Water is needed by every cell of the human body as the water helps to transport nutrients and oxygen. The availability of fresh water for drinking from natural resources is determined by rainfall. Water scarcity is becoming a global problem and is expected to worsen further in the coming decades. Additionally, the disproportionate increase in urbanization places increasing pressure on already stressed natural water resources. Yet, another impending and related concern besetting the human population is water pollution. Industrial effluents and untreated domestic waste more often find their way to freshwater resources. On the other hand, organic and inorganic pollutants originating from either human activities or soil leaching contribute towards polluting ground water. Industrial contaminants from oil refineries, underground storage tanks, and transmission pipelines often find their way into ground water. Due to the persistent nature of these pollutants, the pollutants pose several health risks to humans, animals, and other living organisms.

The oceans make up 70 percent of the earth's surface and account for 96 percent of the water on the planet. However, ocean water is not suitable for human consumption as ocean water is saturated with salts. In recent years, water purification methods have garnered a lot of attention from researchers and innovators. Nanoscale composite materials of high surface area, chemical reactivity, mechanical strength, and cost-effectiveness show a huge potential for water treatment and purification. Nanocomposites can eliminate bacteria, viruses, inorganic pollutants, and/or organic pollutants from wastewater in a variety of forms, such as chelation, absorption, ion exchange, or any other suitable mechanism.

Several efforts have been made to utilize nanocomposites for solving the water scarcity problem. However, drawbacks such as toxicity, adverse environmental effects, and expensive nature of the proposed solutions make them inappropriate and cumbersome to adopt.

U.S. Pat. No. 10,913,021B2 discloses a water purification device that includes a heavy metal removal layer, a biological species removal layer and a support layer. While the water purification device may also include chitosan nanoparticles and/or aluminum oxide hydroxide nano-whiskers in separate layers, the chitosan nanoparticles and/or aluminum oxide hydroxide nano-whiskers are not included in the heavy metal removal layer, but included in the biological species removal layer or an additional anti-fouling layer.

Thus, there is an unmet need to provide suitable, simple, cost-effective and green solutions to combat water pollution and purify water for human consumption. Accordingly, it is one object of the present disclosure to provide methods that utilize nanocomposites for water treatment and water desalination.

SUMMARY

In an exemplary embodiment, a method of removing a metal ion from water, includes treating the water with a nanocomposite to absorb the metal ion with the nanocomposite and form a polymer-metal ion composite and removing the polymer-metal ion composite from the water. The nanocomposite includes aluminum oxide dispersed in a matrix of an uncrosslinked graft copolymer that includes a chitosan backbone and side chains of poly (itaconic acid) grafted to the chitosan backbone having a plurality of amino groups that are acetylated by itaconic acid.

In another exemplary embodiment, the method includes acidifying the polymer-metal ion composite to remove the metal ion from the polymer-metal ion composite and regenerate the nanocomposite. In an embodiment, the metal ion is $Cu^{2+}$ ion and the acidifying includes mixing the polymer-metal ion composite with nitric acid to remove the $Cu^{2+}$ ion from the polymer-metal ion composite. In another exemplary embodiment, the method includes treating the water with the nanocomposite formed by the acidifying to remove the metal ion from the water.

In another exemplary embodiment, the method further includes forming the uncrosslinked graft copolymer by adding sodium bisulfite, potassium persulphate and itaconic acid to chitosan in acetic acid to form a solution; heating the solution to an elevated temperature for a period of time to form uncrosslinked graft copolymer; filtering the solution to obtain a crude product including the uncrosslinked graft copolymer and unreacted chitosan; and removing the unreacted chitosan from the crude product by Soxhlet extraction with ethanol to obtain the uncrosslinked graft copolymer. In an example, the sodium bisulfite has a concentration of 0.01-0.03 M in the solution; the potassium persulphate has a concentration of 0.01-0.03 M in the solution; the chitosan has a concentration around 0.1 M in the solution; the itaconic acid has a concentration of 0.1-0.2 M in the solution; the elevated temperature is in the range of 30-60° C.; and the period of time is between 1 hour and 6 hours.

In another exemplary embodiment, the method includes forming the nanocomposite by solution casting a mixture of the uncrosslinked graft copolymer and aluminum oxide nanoparticles. In an embodiment, the method further comprises dissolving the uncrosslinked graft copolymer in acetic acid to obtain a polymer solution and adjusting the pH of the polymer solution to the range of 6-7. A suspension of aluminum oxide nanoparticles is added in water portion-wise to the polymer solution to form the mixture followed by stirring the mixture with casting the mixture onto a carrier substrate; and drying the cast mixture to form the nanocomposite film. In an example, the aluminum oxide nanoparticles have an average particle size of less than 50 nm.

In an exemplary embodiment, the treating of water includes immersing the nanocomposite in the water and shaking the water at an elevated temperature. In an example, the method further includes shaking the water between 30° C. and 60° C. at a speed of 100-300 rpm for 1-3 hours. In an exemplary embodiment the method includes removing metal ion at least one of $Cu^{2+}$ and $Zn^{2+}$. In another example, the metal ion includes at least one of $Na^+$ and $K^+$.

In an exemplary embodiment, the uncrosslinked graft copolymer includes the side chains of poly (itaconic acid) grafted to the chitosan backbone via C6 hydroxyl groups. In another example, a grafting density of itaconic acid is between 20 wt. % and 60 wt. %, the grafting density including poly (itaconic acid) grafted to the chitosan backbone and the itaconic acid acetylating the plurality of amino groups of the chitosan backbone.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
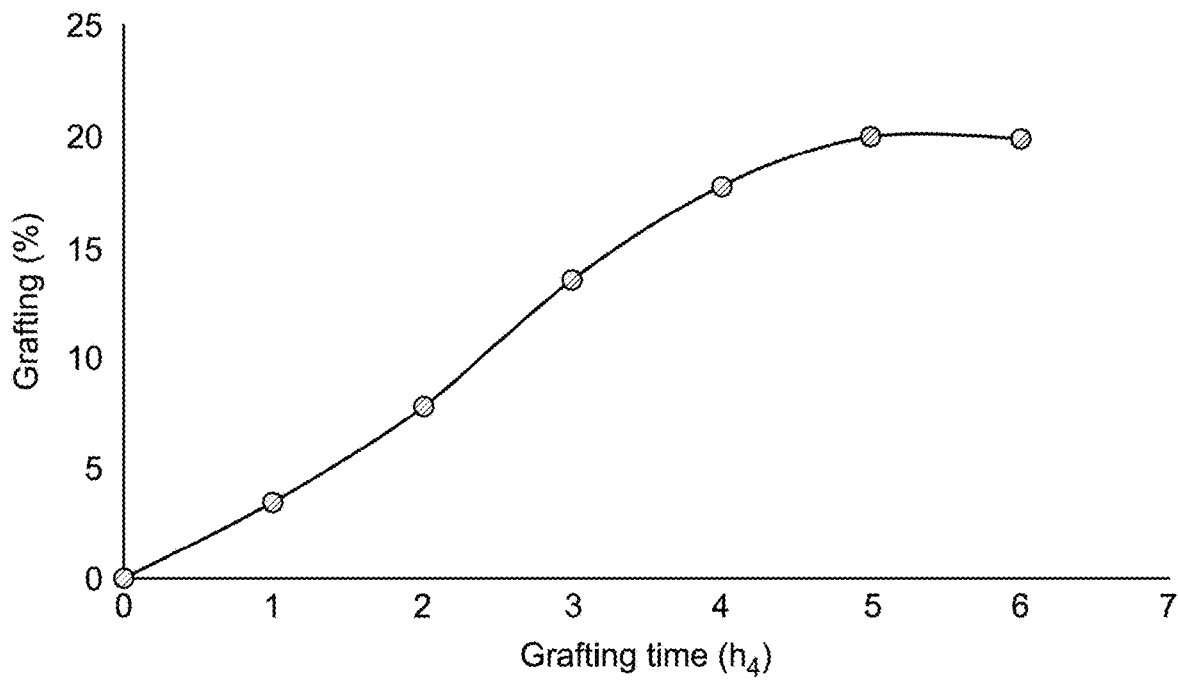
FIG. 1 is a graphical representation depicting effect of grafting time on the grafting percentage of a chitosan-graft-itaconic Acid (CS-g-IA) copolymer, in accordance with exemplary embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The term, "nanocomposite", as used herein, refers to multiphase material where one of the phases has one, two or three dimensions of less than 100 nanometers (nm) or a material resulting due to amalgamation of matrix continuous phase matrix and a nano-dimensional material discontinuous phase.

The term "alkyl", unless otherwise specified, refers to both branched and straight chain saturated aliphatic primary, secondary, and/or tertiary hydrocarbons of typically C1 to C21, for example C1, C2, C3, C4, C5, C6, C7, C8, C9, C10, C11, C12, C13, C14, and specifically includes, but is not limited to, methyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl.

The term "chitosan", as used herein, comprises high molecular weight chitosan and low molecular weight chitosan, wherein the chitosan can be viewed as chitin with a degree of deacetylation that is typically at least about 70%, at least about 75%, at least about 80%, at least about 85%, at least about 90%, at least about 95%, at least about 99%, or the chitin can be substantially fully deacetylated.

The term "$Al_2O_3$" or "aluminium oxide", as used herein, comprises aluminium oxide nano powder.

The term "graft copolymers", as used herein, refer to copolymers with a main polymer chain, also known as the backbone, having one or more side polymer chains attached to it through covalent bonds.

The term "wastewater", as used herein, refers to any form of used water and includes water that has either been affected by domestic, industrial, and commercial use or water that is used to transport waste.

The term "desalination", as used herein, refers to any process or method or a device used to remove salts and minerals from a liquid including water irrespective of the source of the water.

Aspects of this disclosure are directed to a method of removing a metal ion from water. The method includes treating the water with a nanocomposite to absorb the metal ion with the nanocomposite and form a polymer-metal ion composite. The nanocomposite includes aluminum oxide dispersed in a matrix of an uncrosslinked graft copolymer that includes a chitosan backbone and side chains of poly (itaconic acid) grafted to the chitosan backbone having a plurality of amino groups that are acetylated by itaconic acid. The method further includes removing the polymer-metal ion composite from the water. In some embodiments, the side chains are distributed randomly along the backbone. In some examples, the side chains are grafted by "grafting to," "grafting from," or "grafting through" or a macromonomer method.

In an exemplary embodiment, the method includes acidifying the polymer-metal ion composite to remove the metal ion from the polymer-metal ion composite and regenerate the nanocomposite. In some embodiments, the acidifying includes use of an acid belonging to a group comprising nitric acid, sulfuric acid, hydrochloric acid, phosphoric acid, citric acid, hexanoic acid or a combination thereof. In some embodiments, the metal ion removed by the method consists of a group including copper, zinc, mercury, cadmium, chromium, lead, gold, uranium, arsenic, sodium, and potassium and alloy or oxide or a mixture thereof. In an exemplary embodiment, the acidifying includes mixing the polymer-metal ion composite with nitric acid to remove the $Cu^{2+}$ ion from the polymer-metal ion composite. In some embodiments, the nitric acid used for the acidification is present as an azeotrope with another liquid at a concentration of up to 70%.

In another exemplary embodiment, the method includes treating water with the nanocomposite formed by the acidification to remove the metal ions from the water. In some embodiments, the nanocomposite consists of a group including membranes, films, sheets, coatings, and particles with improved adsorption capacity. In some examples, the nanocomposites are part of a portable device for water treatment for industrial, domestic, or scientific applications.

In an exemplary embodiment, the method includes treating the water with the nanocomposite membrane comprising aluminum oxide dispersed in a matrix of the uncrosslinked graft copolymer disposed within the polymer matrix and the film is substantially permeable to water and substantially impermeable to impurities. In some examples, the impurities include at least one of a sodium ion, a potassium ion, a magnesium ion, a calcium ion, a silicate, an organic acid, or a nonionized dissolved solid with a molecular weight of greater than about 200 Daltons or a mixture thereof.

In an exemplary embodiment, at least about 50, 55, 60, 65, 70, 75, 80, 85, or 90% of the aluminum oxide nanoparticles can be positioned between various surfaces of the film. In one embodiment, the aluminum oxide nanoparticles can be substantially encapsulated within the film. The term "encapsulated," means that at least about 70, 75, 80, 85, or 90% the nanoparticles can be positioned between the surfaces of the film.

In an exemplary embodiment, the nanocomposites of the method may further include some additional nanoparticle materials such as, $SiO_2$, $TiO_2$, and the like. Other materials suitable for use as nanoparticles include metals, such as, silver (Ag) for antimicrobial activity. In some examples, additional nanoparticles known for high thermal conductivity are also included in the nanocomposites, such as, bromate ($BrO_3$).

In an exemplary embodiment, the treatment of the water with the nanocomposite formed by the acidifying to remove the metal ions from the water includes reverse osmosis. In another exemplary embodiment, the water treatment method is forward osmosis. In an example, the nanocomposite is used for filtration or ultrafiltration of water. In another example, the nanocomposite is used for the treatment of wastewater in a wastewater treatment plant. In yet another example, the nanocomposite is used for the treatment of saline water in a desalination plant.

In an exemplary embodiment, the method of the present disclosure is applied to an apparatus for the desalination of water having a funnel-and-gate configuration wherein the gate comprises one or more layers of the graft copolymer nanocomposite membrane or film for the removal of impurities from the water. In an example, the impurities include metals such as copper, zinc, sodium, and potassium and alloy or oxide or a mixture thereof. The graft copolymer nanocomposite may remove one or more metals at the same time with equal specificity for the metals present in the water. In some examples, the metal ions include $Cu^{2+}$ ions and the method further includes mixing the polymer-metal ion composite with nitric acid to remove the $Cu^{2+}$ ions from the polymer-metal ion composite. In another example, the metal ions include at least one of $Zn^{2+}$, or $Na^+$ or $K^+$.

In an exemplary embodiment, the branched and uncrosslinked graft copolymers exhibit adsorption efficiency such that the $Cu^{2+}$ and $Zn^{2+}$ are removed from the wastewater contaminated with salts including $CuCl_2$ and $ZnCl_2$. In yet another exemplary embodiment, the branched and uncrosslinked graft copolymers show desalination efficiency for the removal of cations such as $Na^+$ or $K^+$ from saline water. In some examples, the method includes regeneration of the cations outside the copolymer matrix using acidification. In some embodiments, the percentage of regeneration is at least between 50 and 60, 60 and 65, 65 and 75, 75 and 80, 80 and 85, 85 and 90, 90 and 95, 95 and 100% of the metal ions present in a sample.

The method also includes using the graft copolymer exhibiting properties of reusability for multiple times. In some embodiments, the methods include using the graft copolymer for at least 4 cycles. In some examples, the method includes using the graft copolymer wherein the metal ion removal efficiency remains almost unaltered after several cycles of the metal scavenging process.

In another exemplary embodiment, the method further includes forming the uncrosslinked graft copolymer by adding sodium bisulfite, potassium persulfate and itaconic acid to chitosan in acetic acid to form a solution. In some embodiments, a peroxide, an azo compound, azobisisobutyronitrile (AIBN), ammonium persulfate, sodium persulfate potassium persulfate, hydrogen peroxide or tert-butylhydroperoxide may be added as an initiator. The method further includes heating the solution to an elevated temperature for a period of time to form uncrosslinked graft copolymer and filtering the solution to obtain a crude product including the uncrosslinked graft copolymer and unreacted chitosan. The unreacted chitosan is removed from the crude product by Soxhlet extraction with ethanol to obtain the uncrosslinked graft copolymer. In one embodiment, the sodium bisulfite has a concentration of 0.01-0.03 M in the solution; the potassium persulphate has a concentration of 0.01-0.03 M in the solution; the chitosan has a concentration around 0.1 M in the solution; the itaconic acid has a concentration of 0.1-0.2 M in the solution. The elevated temperature is in the range of 30-60° C. and the period of time is between 1 hour and 6 hours. In some embodiments, the concentration of sodium bisulfite, potassium persulphate, the chitosan, and the itaconic acid is 0.01 M, 0.01 M, 0.1 M, and 0.1 M respectively in the solution. In some embodiments, the concentration of sodium bisulfite, potassium persulphate, the chitosan, and the itaconic acid is 0.03 M, 0.03 M, 0.1 M, and 0.2 M respectively in the solution. In some embodiments, the temperature is 30° C., 35° C., 40° C., 45° C., 50° C., 55° C., or 60° C. and the period of time is about 1 hour, 1.5 hours, 2 hours, 2.5 hours, 3 hours, 3.5 hours, 4 hours, 4.5 hours, 5 hours, 5.5 hours, or 6 hours. The Soxhet extraction implemented for the method may be automated Soxhlet extraction, focused microwave-assisted Soxhlet extraction, ultrasound-assisted Soxhlet extraction, high-pressure Soxhlet extraction, fluidized bed extraction or a combination of all such methods with similar underlying principles of extraction. In an example, the Soxhet extraction may be combined with modified extraction methods such as Soxtec, Soxtherm, or a hot Soxhlet method.

In another exemplary embodiment, the method includes forming the nanocomposite by solution casting a mixture of the uncrosslinked graft copolymer and aluminum oxide nanoparticles. A homogeneous mixture or a suspension of the uncrosslinked graft copolymer and aluminum oxide nanoparticles is formed and cast to form the nanocomposite. In an example, the method further comprises dissolving the uncrosslinked graft copolymer in acetic acid to obtain a polymer solution and adjusting the pH of the polymer solution to the range of 6-7. In some embodiments, the uncrosslinked graft copolymer may be dissolved in a mixture of solvents including acetic acid to enhance the rate of dissolution. In an example, the mixture of solvent is a solvent/non-solvent binary mixture. Furthermore, a suspension of aluminum oxide nanoparticles is added in water portion-wise to the polymer solution to form the mixture and stirring the mixture. The method includes casting the mixture onto a carrier substrate and drying the cast mixture to form the nanocomposite film. In an example, the aluminum oxide nanoparticles have an average particle size of less than 50 nm. In some examples, the average particle size of the aluminum oxide nanoparticles is less than or equal to 10 nm, 15 nm, 20 nm, 25 nm, 30 nm, 35 nm, 40 nm, or 45 nm.

In an exemplary embodiment, the treating of water includes immersing the nanocomposite in the water and shaking the water at an elevated temperature. In an example, the method further includes shaking the water between 30° C. and 60° C. at a speed of 100-300 rpm for 1-3 hours. In some embodiments, the shaking of the water is done at 30, 35, 40, 45, 50, 55, or 60° C. at a speed of 100, 120, 150, 170, 200, 220, 250, 300 rpm. In some examples, the water treatment includes use of nanocomposites in the form of sheets or particles, or films included as a part of water treatment apparatus to filter the water.

In some embodiments, the method includes removing the metal ions comprising a group including copper, zinc, mercury, cadmium, chromium, lead, gold, uranium, arsenic, sodium, and potassium and alloy or oxide or a mixture thereof. In an example, the method includes removing metal ions including at least one of $Cu^{2+}$ and $Zn^{2+}$ from the water. In another example, the metal ions include at least one of $Na^+$ and $K^+$.

In an exemplary embodiment, the uncrosslinked graft copolymer includes the side chains of poly (itaconic acid) grafted to the chitosan backbone via C6 hydroxyl groups. In another example, a grafting density of itaconic acid is between 20 wt. % and 60 wt. %, the grafting density including poly (itaconic acid) grafted to the chitosan backbone and the itaconic acid acetylating the plurality of amino groups of the chitosan backbone. In one example, the grafting density of itaconic acid is 20, 25, 30, 35, 40, 45, 55, or 60 wt. %.

In one embodiment, the poly (itaconic acid) grafted to the chitosan backbone has a low crosslink density and exhibits superabsorbent properties. In one example, the poly (itaconic acid) exhibit superabsorbent properties including absorbency rate, absorbency under pressure, and swelling capacity. In an exemplary embodiment, the superabsorbent properties of the poly (itaconic acid) grafted to the chitosan backbone are used for wastewater treatment. In another embodiment, the superabsorbent properties of the poly (itaconic acid) grafted to the chitosan backbone are used for desalination. In another embodiment, poly (itaconic acid) is biodegradable in nature and is obtained via biosynthetic processing of carbohydrates by fungi or other organisms.

In various examples, the uncrosslinked graft copolymer includes the side chains of a poly (itaconic acid) derivative grafted to the chitosan backbone via C6 hydroxyl groups. In an exemplary embodiment, the uncrosslinked graft copolymer includes the side chains of poly (dialkyl itaconate) grafted to the chitosan backbone via C6 hydroxyl groups. In some examples, the uncrosslinked graft copolymer includes the side chains of dimethyl itaconate grafted to the chitosan backbone via C6 hydroxyl groups. In another example, the uncrosslinked graft copolymer includes the side chains of di-n-butyl itaconate or diethyl itaconate grafted to the chitosan backbone via C6 hydroxyl groups. In some exemplary embodiments, the uncrosslinked graft copolymer includes the side chains of a poly (dicyclohexyl itaconate), or poly (di-sec-alkyl itaconate), or an intermediate such as poly (itaconic anhydride).

In an exemplary embodiment, the uncrosslinked graft copolymer includes the side chains of poly (dialkyl itaconate) grafted to the chitosan backbone wherein the side chain length increases with the increase in time during copolymerization. In one example, the maximum percentage of the graft increase is between 10 to 20% at 2 to 3 hours' time during the copolymerization. In one embodiment, the graft process occurs onto 2 grams chitosan at a monomer concentration of 0.15M and 0.02M concentration sodium bisulfite and potassium persulfate at 40° C. for 5 hours.

In the present disclosure, the advantages of the method include that the graft copolymerization improves the chelating efficiency of the chitosan by constructing extra absorption sites onto the chitosan polymeric matrix suitable for water treatment applications such as desalination and the removal of metal ions from wastewater. Itaconic acid (IA) is used as a comonomer for the graft copolymerization with the chitosan. The compound exhibits two carboxylic groups enabling the complexation as well as an ethylenic bond enabling the graft copolymerization reactions. To enhance the water flow through the graft copolymer, nano aluminum oxide is added to it, as dispersed matrix to form the nanocomposite film.

Yet, another advantage of the present method is the development of uncrosslinked graft copolymers such that the water desalination, or water treatment, or wastewater treatment is efficient and enhanced.

In an exemplary embodiment, the nanocomposite is disposed on and/or in a porous membrane in a pipe portion of a device. The membrane extends in a lateral plane that is perpendicular to a longitudinal direction of the pipe portion. The membrane has a source water side facing an inlet of the pipe portion and a permeate side facing an outlet of the pipe portion. Water passes through the membrane from the source water side to the permeate side, and metal ions present in the water are adsorbed by the nanocomposite on or in the membrane. As a result, metal ion concentration is lower on the permeate side than on the source water side. The water may be contacted with the membrane at ambient pressure, reduced pressure or elevated pressure. Preferably the water is forced through the membrane at a pressure of at least 1 atm, preferably 1-100 atm, 5-50 atm or about 10 atm. For example, the permeate side can be configured to be exposed to ambient pressure or reduced pressure while the source water side can be configured to be exposed to elevated pressure. Pressure gradient between the permeate side and the source water side can be adjusted to at least 1 atm, preferably 1-100 atm, 5-50 atm or about 10 atm to force the water through the member. In some embodiments, the pipe portion may have a plurality of membranes that are spaced apart so that water passes through the plurality of membranes in succession. The plurality of membranes may include the nanocomposite and/or other suitable materials for water purification. In some embodiments, the device may have a plurality of pipe portions. The nanocomposite may be used in conjunction with other membranes. In another embodiment, the nanocomposite is immobilized as a film on a support. The film with the support may be immersed in water in the presence of ultrasound to adsorb metal ions. In another embodiment, the nanocomposite is processed into particles for filling a cartridge through which the water passes.

EXAMPLES

Materials

Chitosan (CS) (medium molecular weight) was obtained from Santa Cruz biotechnology (SCBT). Sodium bisulfite (SBS) was obtained from Across organics. Potassium persulphate (PPS) was obtained from Winlab Limited. Itaconic acid (2-methylenesuccinic acid, 1-propene-2-3-dicarboxylic acid) was obtained from Riedel-de-Häen. Sodium acetate anhydrous, Zinc sulphate, Cupric sulfate and 1,4-Dioxan were obtained from BDH Chemicals Ltd., Poole England. Ethanol was purchased from Fisher Chemical. Acetic acid was obtained from Honeywell Fluka™. Potassium chloride and Nitric acid were purchased from Sigma-Aldrich. Nano aluminum oxide was purchased from Sigma Aldrich. All aqueous solutions were prepared using deionized water.

Synthesis of Chitosan Graft Itaconic Acid

In one example, the novel graft copolymerization occurred in two necked round bottom flasks. An appropriate concentration of initiators (0.01 M, 0.02 M and 0.03 M) of Sodium bisulfite (SB) and potassium persulphate (PPS) was added to (2 g) CS in 0.1 M acetic acid., at a specific temperature (30° C., 40° C., 50° C., 60° C.) in ultrasonic bath of power 300 watt. A specific concentration of itaconic acid (IA) (0.1 M, 0.15 M, and 0.2 M) was added, for various intervals of time (1 hour, 2 hours, 3 hours, 4 hours, 5 hours and 6 hours). The copolymer was filtered, washed with ethanol in the Soxhlet extraction to remove the homopolymer. The copolymer was dried and weighted, then the graft percentage was calculated [*Int. J. Biol. Macromol.*, 2014, 68, 21. incorporated by reference herein in its entirety.].

Preparation of (Chitosan-g-IA)-$Al_2O_3$ Nanocomposite

In one example, 1 g of (chitosan-g-IA), was dissolved in 50 mL of 2% (v/v) acetic acid solution on a magnetic stirrer for 10 h at room temperature to afford a 2% (w/v) CS solution. The pH of the resulting CS solution was adjusted to the range of 6-7 by adding the appropriate amount of 1 M NaOH solution under stirring. Now, a suspension of 0.5 g of $Al_2O_3$ (nano powder, <50 nm particle size Transmission electron microscope (TEM), 544833 Sigma-Aldrich) in small amount of double-distilled water was added portionwise to the (chitosan-g-IA) solution under continuous stirring. The mixture was further stirred for 3 h at room temperature, then cast into a 100 mm Petri dish, and dried overnight at 70° C. to remove any acetic acid traces. Finally, the obtained (chitosan-g-IA)/$Al_2O_3$ nanocomposite film was detached, washed with distilled water, and dried at 60° C. to ensure that all the solvent was removed completely from the film.

Preparation of Stock Solutions of Metal Ions

In one example, the standard stock solution of Cu (II) or Zn (II) (200 ppm) was diluted with deionized water to obtain the desired concentrations. The commonly used concentration for stock copper solution was 10 ppm [*Miner. Eng.*, 2018, 123, 1 incorporated by reference herein in its entirety.].

Method of Removal of Metal Ions

In one example, 300 mg of graft copolymer nanocomposite were immersed in 50 ml of (buffer solution of a definite pH (6, 6.5, and 7) value and an aqueous solution of Cu (II) or Zn (II) ions (10 mg/L)). The content was allowed to shake, in a shaker, at a speed of 200 rpm, at a given temperature (30° C., 45° C. or 60° C.), for various intervals of time (1 h, 2 h, and 3 h). The mixture was separated by filtration. The adsorption uptake was determined by difference in concentration (before and after the adsorption process) using Inductively Coupled Plasma (ICP) for quantitative determination. While the residual metal content into the polymeric matrix was determined as qualitative investigation using X-ray powder diffraction (XRD) and Scanning electron microscopy and energy dispersive X-ray spectroscopy (SEM/EDS) [*Int. J. Biol. Macromol.*, 2017, 104, 1495 incorporated by reference herein in its entirety.].

Desalination Process

In one example, the desalination process was conducted using 0.3 g of CS-g-copolymers into 100 ml of the stock solutions and subjected to shaker for a particular interval of time (1 hour, 2 hours and 3 hours) at 200 revs·$min^{-1}$. The suspension was passed through filter-paper and the residue was analyzed using SEM/EDS.

Results and Discussion

Graft copolymerization of Chitosan (CS) with Itaconic acid (IA), using Potassium persulphate (PPS) and Sodium bisulfite (SB) as redox initiators, was performed, aiming to construct extra adsorption sites onto chitosan backbone for water treatment applications, such as removal of metal cations from wastewater and desalination of saline water. To determine the desired conditions for the achievement of maximum graft percentage, the main parameters affecting the graft copolymerization were studied.

Study of Various Parameters Affecting the Graft Copolymerization

The following equation was used to calculate the grafting percentage.

$$G\% = W - W_0/W_0 \times 100\%$$

Wherein G % is the grafting density, W and $W_0$ represent the weight after grafting and weight before grafting, respectively.

Effect of Time

Referring to FIG. 1, in some embodiments, the effect of various intervals of time on the grafting copolymerization of IA onto CS is shown. The results show that the percentage of graft increased gradually with the increase in time due to the increase in the chain length of the grafting branches until it reached a maximum value. Subsequently, the increase in the reaction time led to a steady state for the G %, due to the consumption of the monomer units forming the polymer branches. The maximum percentage of graft was found to be 19.95% at 5 hours.

Effect of Temperature

Figure 2:
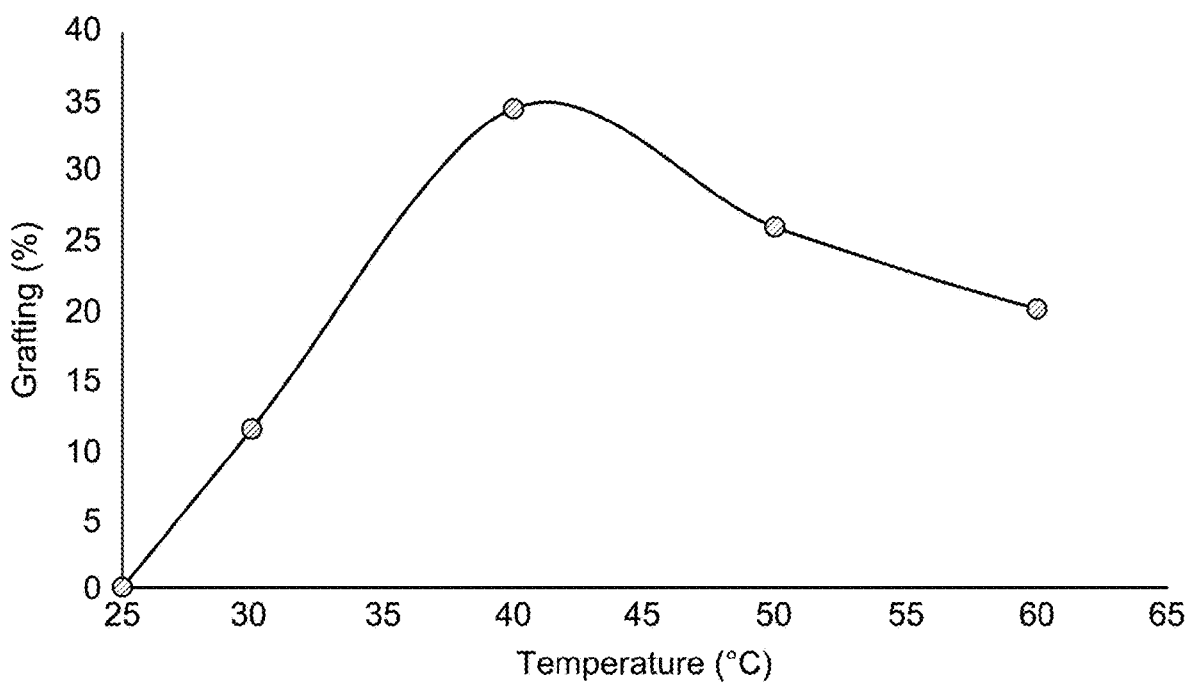
FIG. 2 is a graphical representation depicting effect of temperature on the grafting percentage of a CS-g-IA copolymer, in accordance with exemplary embodiments of the present disclosure.

Referring to FIG. 2, in some embodiments, to investigate the effect of reaction temperature on the graft copolymerization reaction, the temperature was increased from room temperature to 60° C., all parameters were kept constant. The maximum percentage of graft was achieved at 40° C. Subsequently, a gradual decrease in percentage of graft was observed with the increase in the temperature, which is attributed to the achievement of ceiling temperature of the constructed polymeric branches.

Effect of Monomer Concentration

Figure 3:
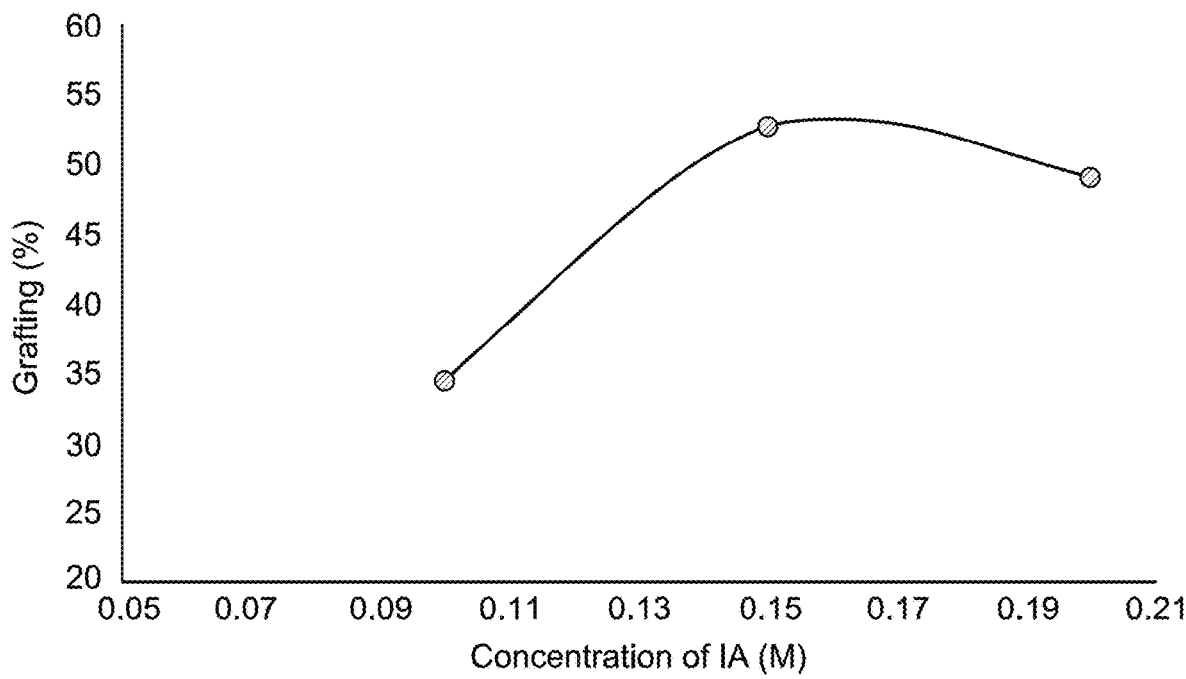
FIG. 3 is a graphical representation depicting effect of monomer (IA) concentration on the grafting percentage of a CS-g-IA copolymer, in accordance with exemplary embodiments of the present disclosure.

Referring to FIG. 3, in some embodiments, the effect of IA concentration on the percentage of graft copolymerization is shown (all other parameters were kept constant). The increase of the monomer concentration increases the graft percentage until it reached a maximum value at a monomer concentration (0.15 mol/L). Increasing the IA concentration showed negligible effect on the percentage of graft, this is due to the fact that IA does not easily form homopolymers [Materials., 2020, 13, 2707 incorporated by reference herein in its entirety.].

Effect of Initiator Concentration

Figure 4:
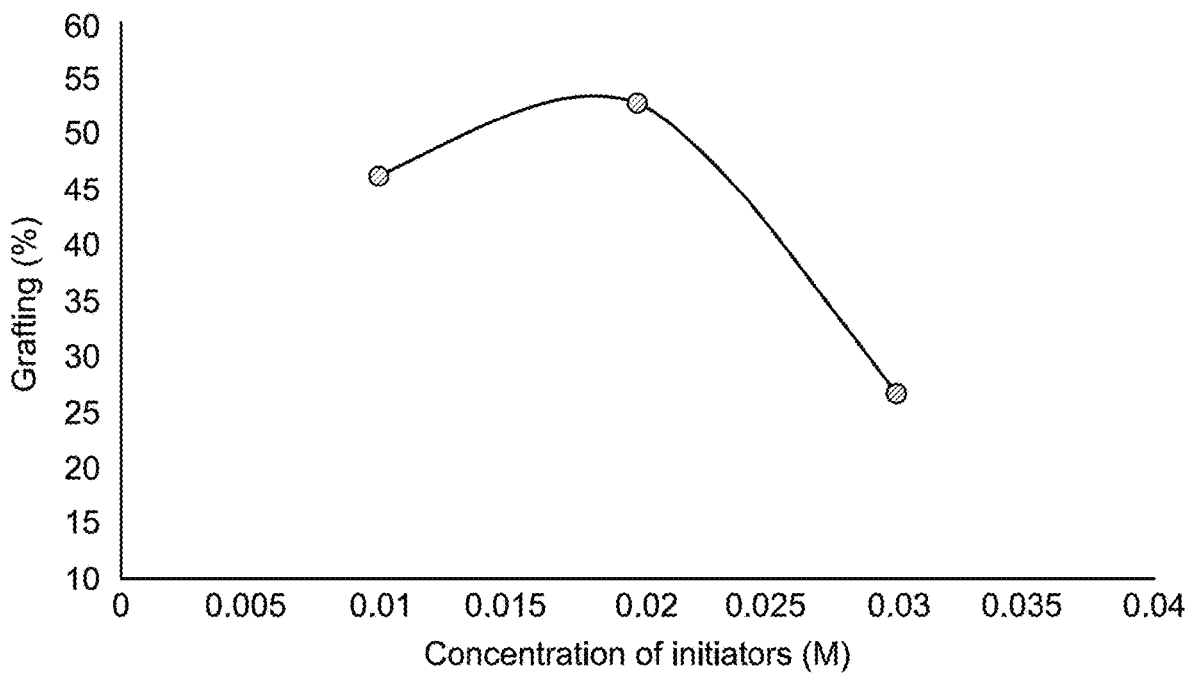
FIG. 4 is a graphical representation depicting effect of initiator concentration on the grafting percentage of a CS-g-IA copolymer, in accordance with exemplary embodiments of the present disclosure.

Referring to FIG. 4, in some embodiments, the effect of initiator concentration on the graft copolymerization onto CS is shown. A gradual increase in G % was observed with the increase in initiator concentration from 0.01 M to 0.02 M. Subsequently, a decrease in the G % was observed by increasing initiator concentration, due to the increase in the probability of chain transfer to initiator reactions. The desired initiator concentration was recorded 0.02 M (52.65%). Thus, the appropriate conditions for the graft process onto 2 grams chitosan were found to be, monomer concentration 0.15M and 0.02M initiator concentration, at 40° C. for 5 hours.

Characterization of Chitosan Graft IA Copolymer

Figure 5:
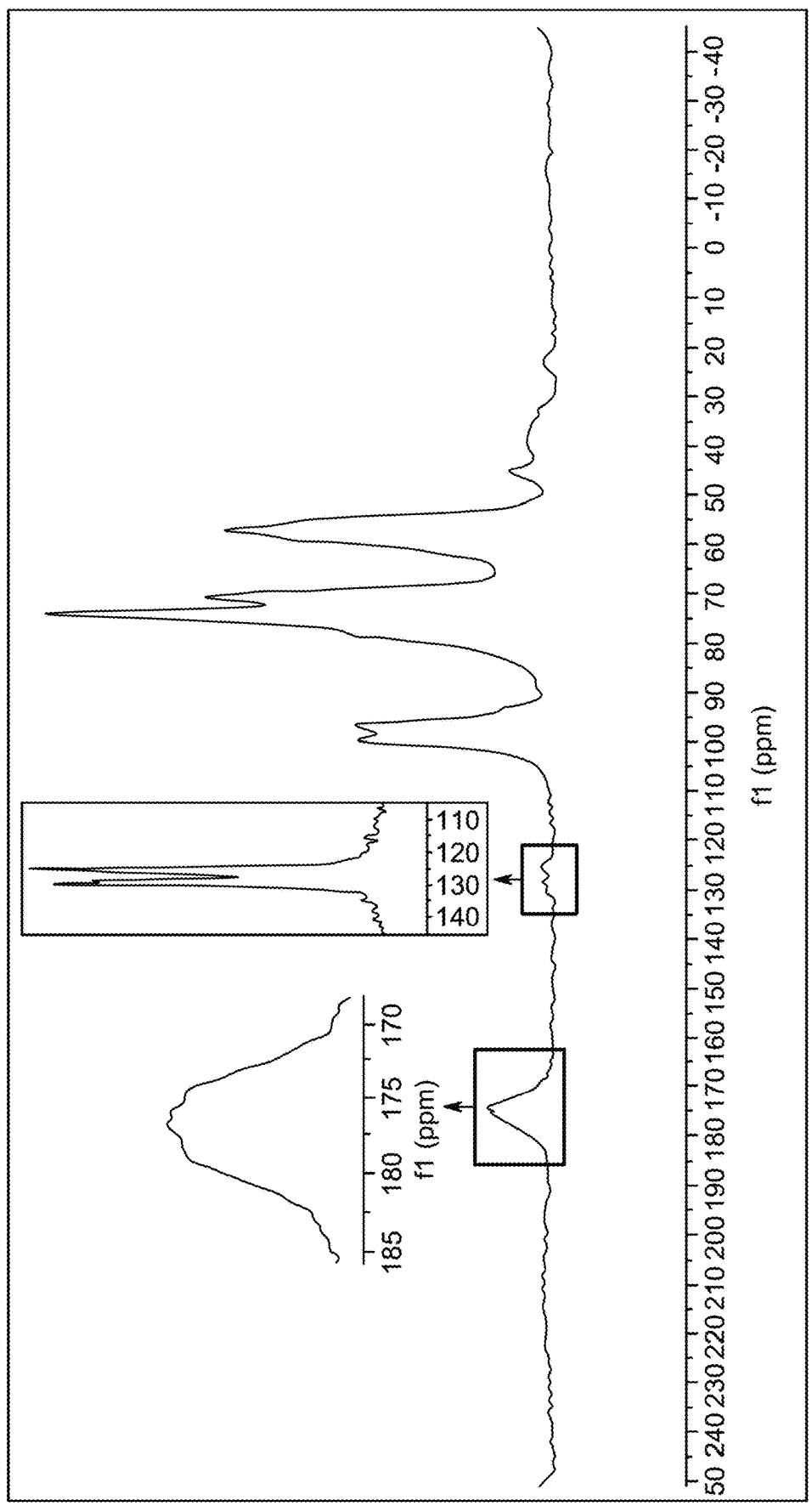
FIG. 5 is a graphical representation depicting carbon-13 nuclear magnetic resonance ($^{13}C$-NMR) spectrum of a CS-g-IA copolymer, in accordance with exemplary embodiments of the present disclosure.
Figure 6:
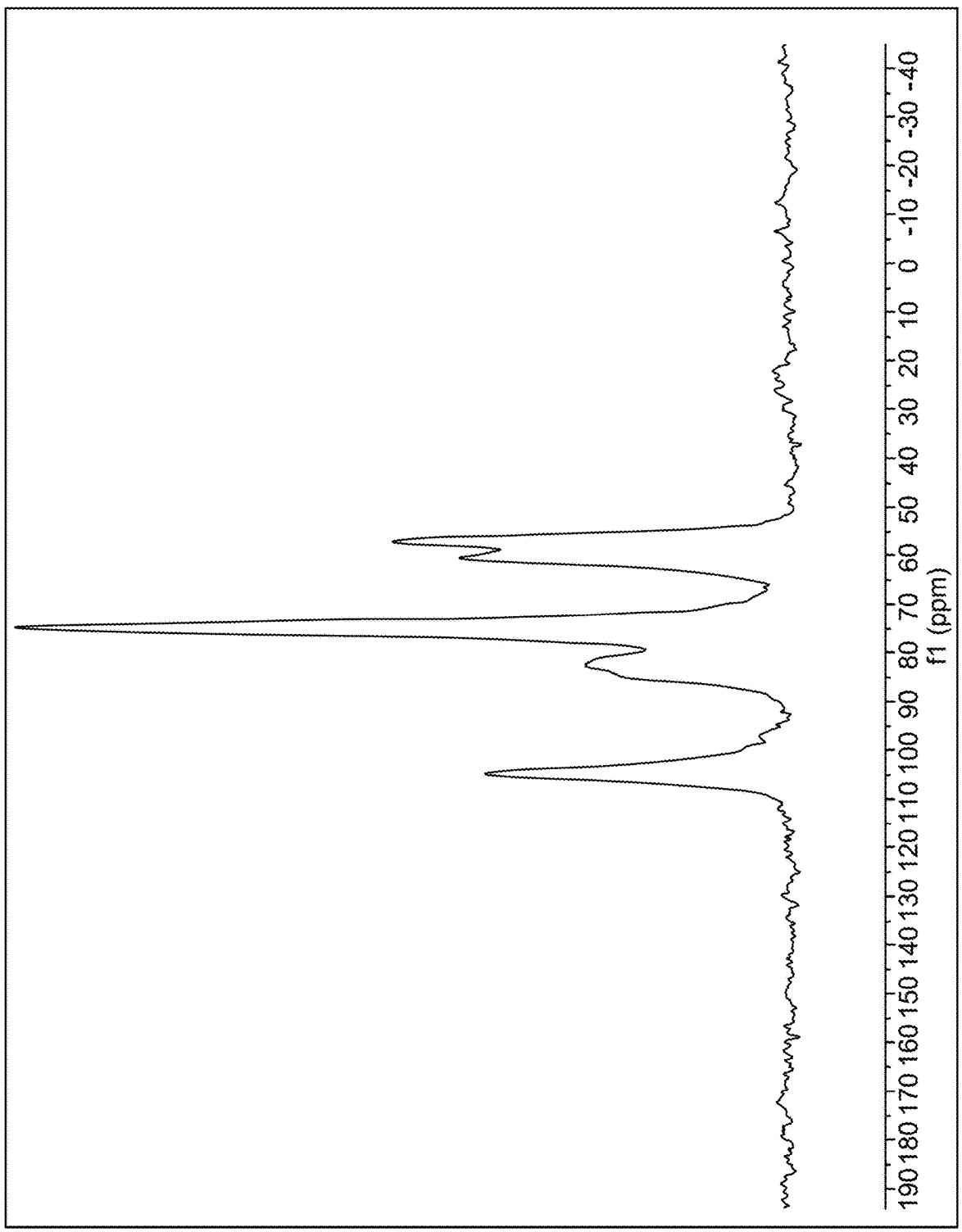
FIG. 6 is a graphical representation depicting $^{13}C$-NMR spectrum of chitosan (CS), in accordance with exemplary embodiments of the present disclosure.

Referring to FIG. 5, in some embodiments, to confirm the reaction of CS and IA as well as to determine the centers of reaction between the polymer and the comonomer, $^{13}C$ NMR spectrophotometer was used. $^{13}$C-NMR of copolymerization of IA onto CS (G %=52.65%) is shown in Table 1 and FIG. 5, the spectral data of parent chitosan is given for comparison in FIG. 6. The spectral data of Chitosan graft Itaconic acid copolymer (CS-g-IA), as compared to that of chitosan showed the following:

TABLE 1

| Structure | Carbon atoms | $^{13}$C-NMR (δ ppm) |
|---|---|---|
| | C1 | 100 |
| | C2 | 55 |
| | C3 | 70 |
| | C4, C4' | 82 |
| | C5 | 79 |
| | C6 | 60 |
| | C7 | 95 |
| | C2' | 59 |
| | C3' | 73 |
| | C5' | 75 |
| | C6' | 74 |
| | C7 | 172 |
| | C8 | 38 |
| | C9 | 130 |
| | C10 | 122 |
| | C11 | 174 |
| | C12 | 77 |
| | C13 | 39 |
| | C14 | 45 |
| | C15 | 177 |
| | C16 | 179 |
| | C17 | 173 |
| | C18 | 23 |

I. Broad peaks (from 170 ppm to 180 ppm) correspond to four types of carbonyl groups, among which σ=172 ppm, 174 ppm, 177 ppm, and 179 ppm, correspond to C7, C11, C15, and C16, respectively. In addition to that already present in the chitosan structure at σ=173 ppm, the five peaks are overlapped to form broad peak stating from σ=172 ppm to 179 ppm.

II. Some of the ethylenic carbons at 129-136 ppm remained unchanged while the saturated ethylic ones appear at 39 and 77 ppm.

All the above data confirmed that IA reacted with CS via both graft and condensation reactions, further confirming utility of performing only polyaddition of IA rather than polycondensation occurred onto crosslinked chitosan backbone [Cao, M. Master Thesis, University of New Hampshire: Durham, 2008 incorporated by reference herein in its entirety.].

Figure 7A:
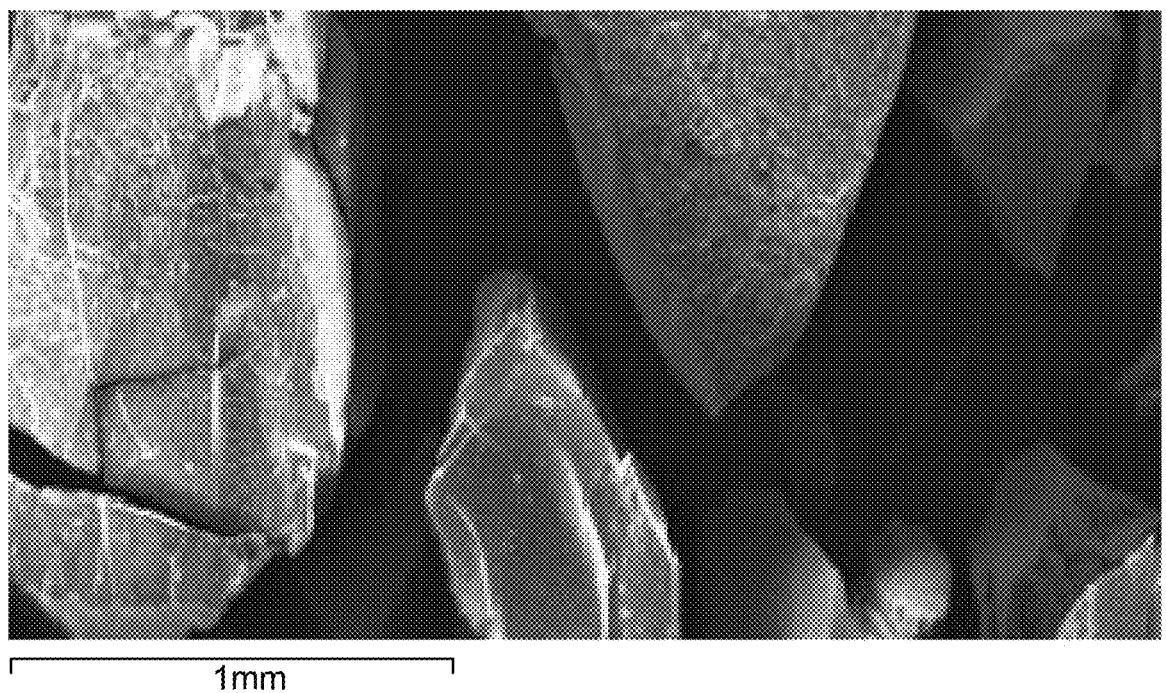
FIGS. 7A and 7B illustrate morphology of chitosan and a CS-g-IA/$Al_2O_3$ nanocomposite, respectively, in accordance with exemplary embodiments of the present disclosure.
Figure 7B:
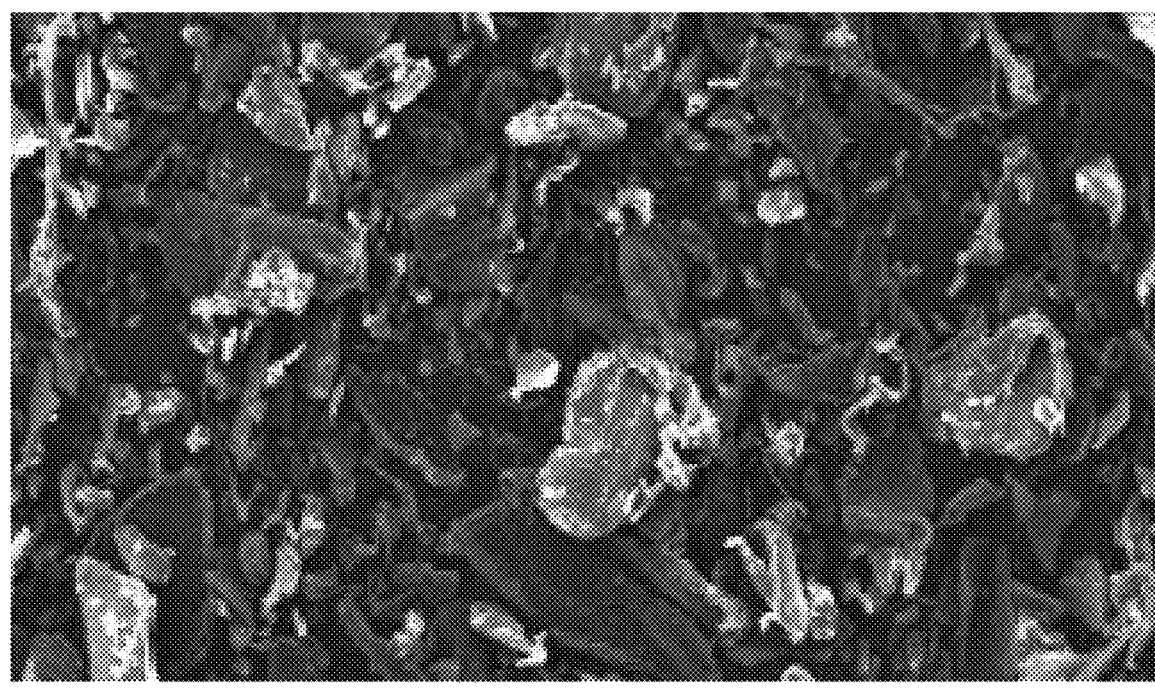

Referring to FIG. 7, in some embodiments, the morphology of CS-g-IA was examined using SEM analysis for further confirmation of the grafting process.

Thermal Properties of Synthesized Chitosan Graft Copolymers

To adjust the synthesized copolymers for water treatment applications, their thermal properties was also studied.

Thermogravimetric Analysis (TGA)

The TGA curve is used to determine the initial decomposition temperature ($T_0$), temperature at which the polymer starts to lose part of its polymeric matrix. In addition to $T_0$, the TGA curve shows the percentage of weight loss with the increase in temperature. The value of $T_0$ depends on the average molecular weight of the polymer [Saudi Pharm. J., 2012, 20 (3), 263 incorporated by reference herein in its entirety.].

TGA of Chitosan

The CS sample of MW=20000 (avg) showed a ($T_0$=235° C.). The polymer lost 55% of its weight at 500° C. The TGA curve of CS also showed water molecules absorption, and while evaporated giving rise to 5% decrease in molecular weight at 70° C. The graft copolymerization of CS would increase the organic nature of the copolymer matrix by the construction of the comonomer branches and decrease the water retention of the polymer.

TGA of Chitosan Graft-Itaconic Acid Copolymers

The grafting process decreases the crystallinity of the CS due to the branches built onto the main chains, which leads to a decrease in the $T_0$ value. Increasing percentage of the graft means increasing the length or the number of branches affecting the secondary forces between the chains and thus, decrease the crystallinity of the polymeric matrix.

Chitosan Graft Itaconic Acid Copolymer

Figure 8:
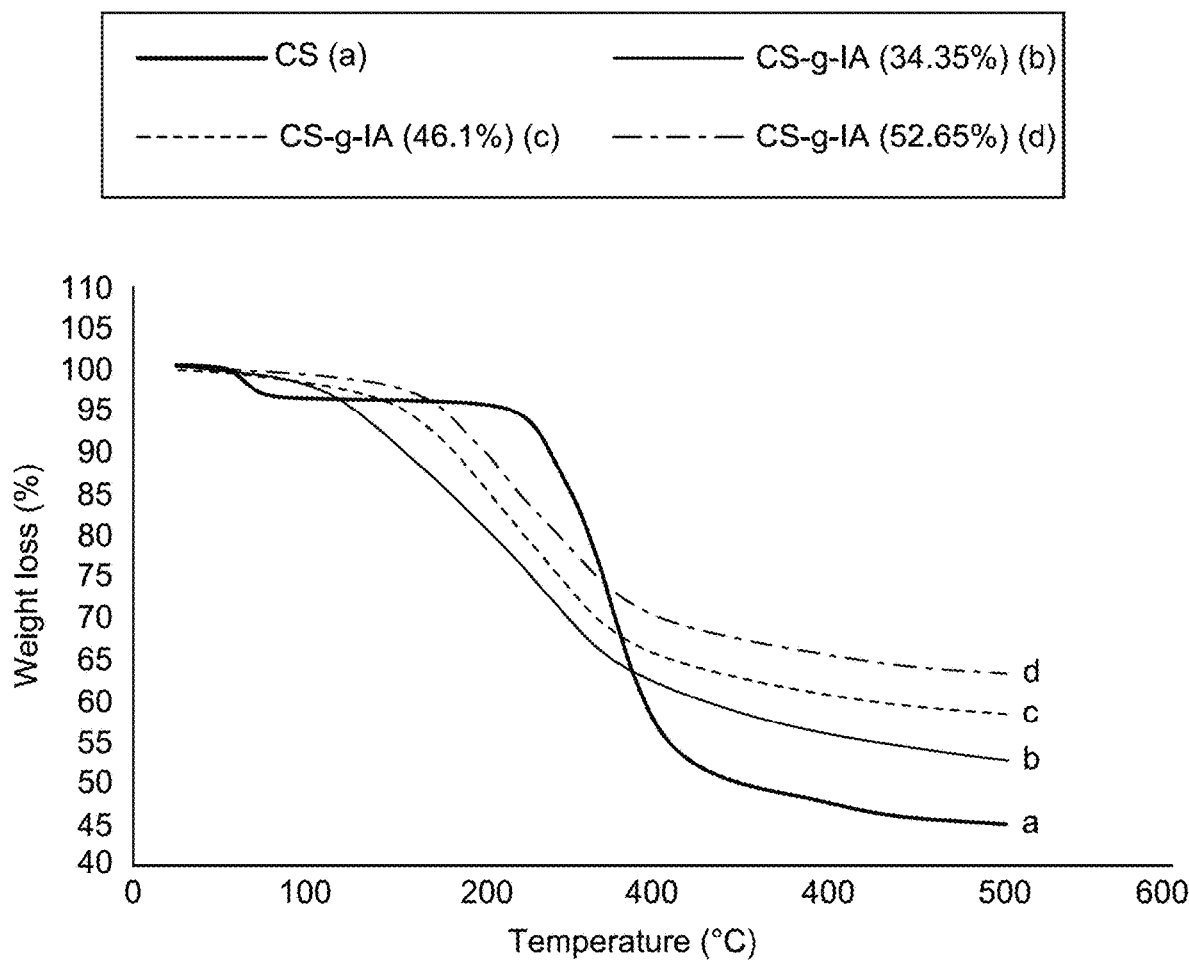
FIG. 8 is a graphical representation depicting thermal gravimetric analysis (TGA) of various grafting percentage of CS-g-IA copolymers as compared to CS, in accordance with exemplary embodiments of the present disclosure.

Referring to FIG. 8, in some embodiments, the $T_0$ of CS was (235° C.), while the graft copolymers showed a lower value for To as compared to parent CS. The value of $T_0$ decreased with the increase in the percentage of the graft (also shown in Table 2). However, at 300° C. the weight loss of the highest percentage of the graft (G %=52.65%) was only 28% as compared to CS 45%. This is due to the extra thermal stability given to the polymeric matrix by the new constructed comonomers. Thus, the IA comonomer supported the CS backbone at high temperatures.

TABLE 2

| Polymer used | $T_0$ | Weight loss at 300° C. | Weight loss at 500° C. |
| --- | --- | --- | --- |
| Chitosan | 235° C. | 45% | 55% |
| CS-g-IA (G % = 34.35%) | 120° C. | 37% | 45% |
| CS-g-IA (G % = 41.60%) | 150° C. | 33% | 42% |
| CS-g-IA (G % = 52.65%) | 165° C. | 28% | 36% |

Applications of Chitosan-g-Itaconic Acid

To enhance the water permeability through the graft copolymers, the aluminum oxide nanocomposite was prepared by the aforementioned solution casting method.

Adsorption of Metal Ions from Contaminated Water

The removal of Cu (II) or Zn (II) ions from contaminated water was investigated according to the method described in the experimental part.

The Adsorption Capacity

The adsorption capacity can be calculated using the following equation [N. J. Chem. Soc. Pak., 2019, 41 (2), 240 incorporated by reference herein in its entirety.].

$$q=(C_0-C_f)/m$$

$C_0$, $C_f$ (mg/L) are initial and final concentration of metal ion in solution, respectively.

V (L)=Volume of the solution.

m (g)=dry weight of the copolymer.

Effect of pH

Figure 9:
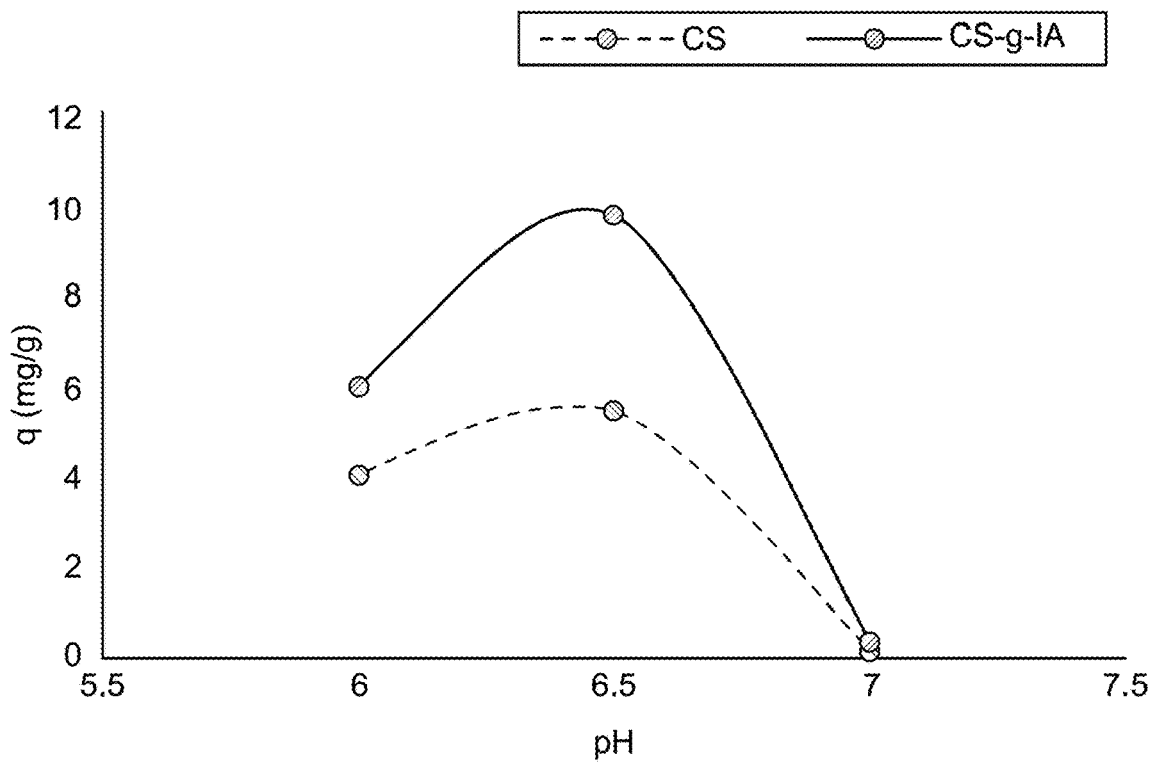
FIG. 9 is a graphical representation depicting effect of pH on adsorption of Cu (II) ions by a CS-g-IA copolymer (G %=52.65%) as compared to CS, in accordance with exemplary embodiments of the present disclosure.
Figure 10:
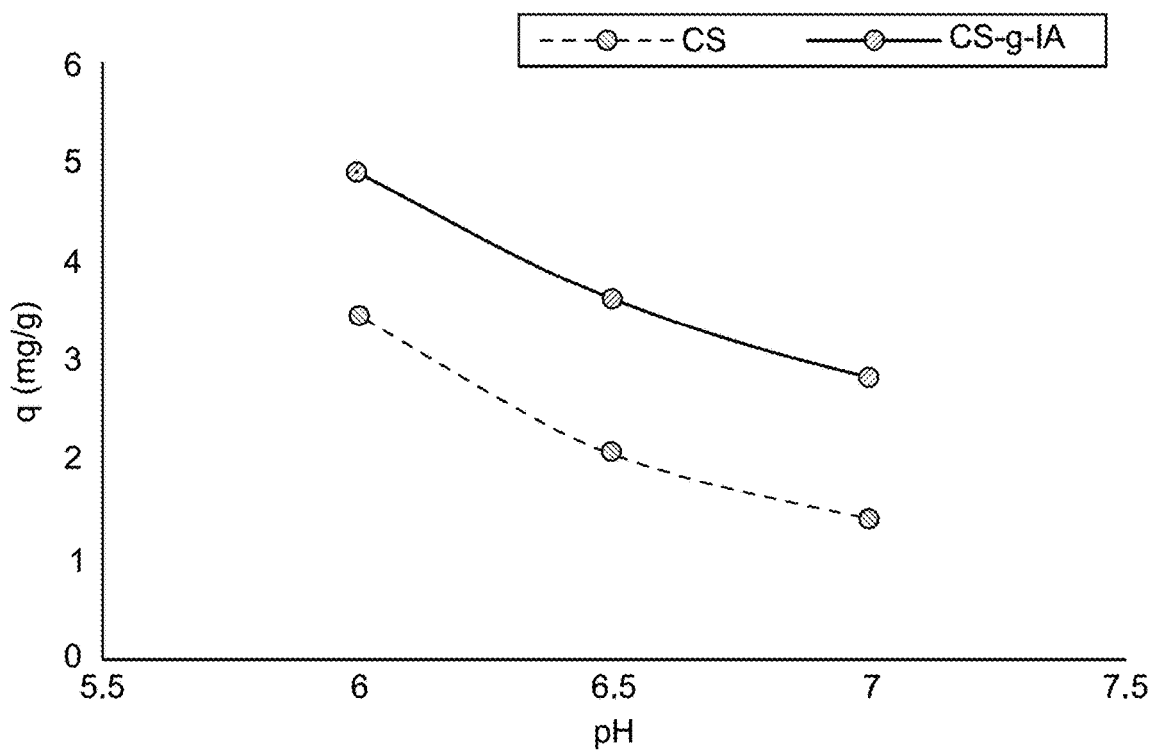
FIG. 10 is a graphical representation depicting effect of pH on adsorption of Zn (II) ions by a CS-g-IA nanocomposite (G %=52.65%) as compared to CS, in accordance with exemplary embodiments of the present disclosure.

The adsorption process is mostly affected by the pH value, which is known to affect the surface charge of the adsorbent, degree of ionization and speciation of the adsorbate [Carbohydr. Polym., 2016, 151, 1091 incorporated by reference herein in its entirety.]. The study of the influence of pH medium on the cation's adsorption of CS graft copolymers as compared to parent CS involved the pH values 6, 6.5 and 7. At acidic pH values, almost 6 or 6.5, deprotonation of functional groups (carboxylic groups) is favored and thus, enhances the electrostatic interaction between them and Cu (II) ions [Colloid Polym. Sci., 2017, 295 (4), 627 incorporated by reference herein in its entirety.]. The pH lower than 6 led to the dissolution of CS. Alkaline pH ($\geq 7.4$) is also excluded from the study as this pH facilitates the precipitation of Cu (OH)$_2$ [Colloid Polym. Sci., 2017, 295 (4), 627 incorporated by reference herein in its entirety.]. Thus, the study of the pH range occurred at pH=6, 6.5 and 7. It should be understood that the graft copolymer may be used for pH >7 in other examples. Referring to the example of FIG. 9, the results show that the maximum removal of Cu (II) ions occurred at 6.5, irrespective of the comonomer used. However, in case of Zn (II) ions the maximum removal was obtained at pH=6, due to the nature of the metal ions and in aqueous solution as shown in FIG. 10. The following equation was applied.

$$q=(C_0-C_f)50/300=(C_0-C_f)1/6$$

Keeping value of solution=50 ml and weight of the copolymer=300 mg, the above equation could be reduced to $$q=(C_0-C_f)$$

The difference in solution concentration was determined by ICP.

The results showed that all graft copolymers exhibited higher adsorption capacity than the parent CS, irrespective of the cations removed or the pH value. This is due to the extra adsorption sites afforded by the comonomer's moieties. Additionally, the adsorption efficiency of CS and its copolymers is higher for Cu (II) ions than for Zn (II) ions.

Effect of Temperature

Figure 11A:
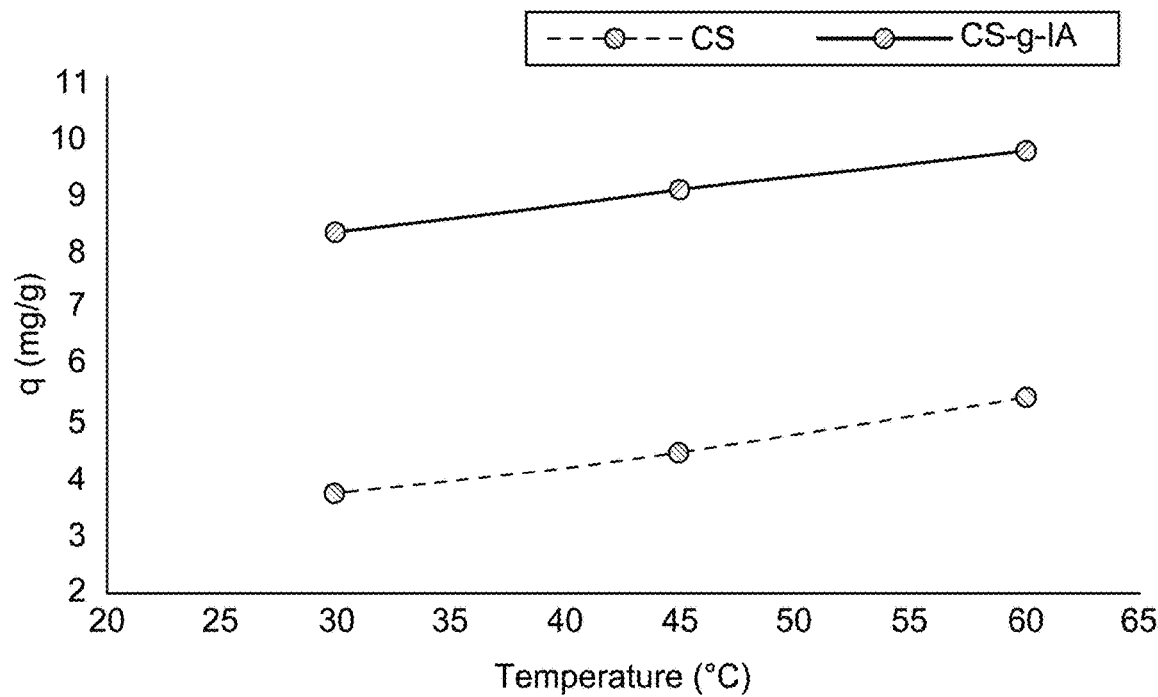
FIG. 11A is a graphical representation depicting effect of temperature on adsorption of Cu (II) ions by a CS-g-IA nanocomposite (G %=52.65%) as compared to CS, in accordance with exemplary embodiments of the present disclosure.
Figure 11B:
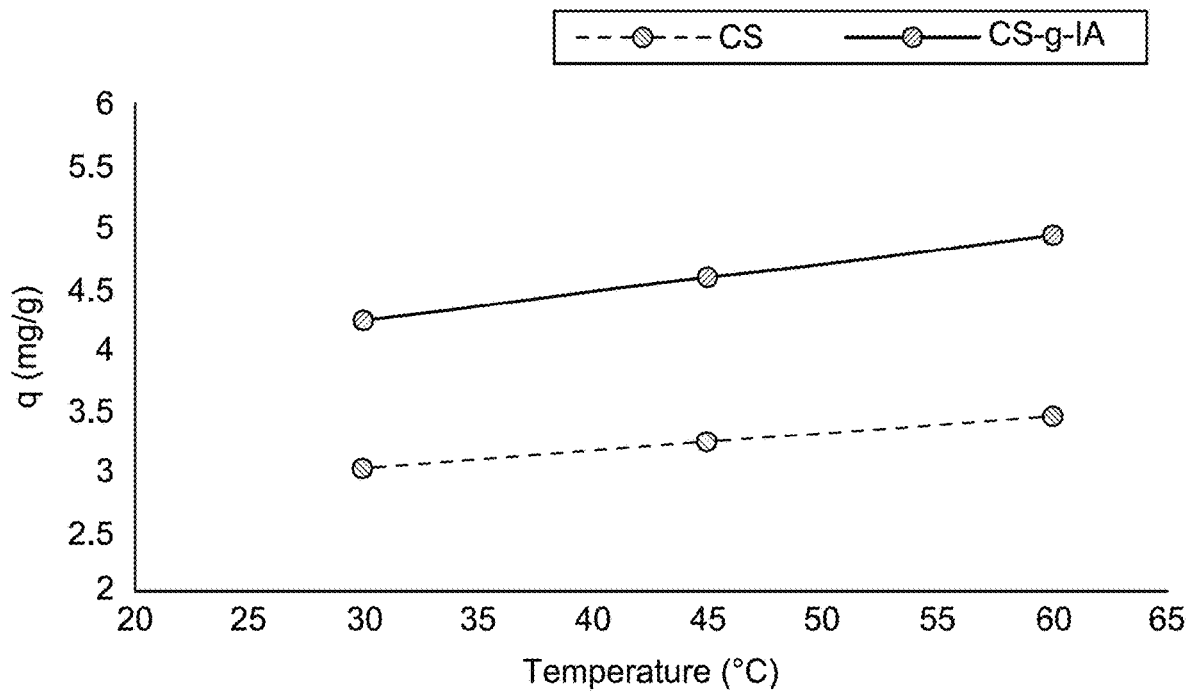
FIG. 11B is a graphical representation depicting effect of temperature on adsorption of Zn (II) ions by a CS-g-IA nanocomposite (G %=52.65%) as compared to CS, in accordance with exemplary embodiments of the present disclosure.

Referring to the examples of FIGS. 11A and 11B, the effect of temperature on the adsorption efficiency of CS graft copolymers towards Cu (II) and Zn (II) ions was also studied. The results showed that CS graft copolymers exhibit slight increase in the adsorption capacity with the increase in temperature. The results showed that the CS exhibited considerable removal capacity for Cu (II) ions (q=6.03). The removal efficiency is due to the amino and hydroxyl groups present in the CS structure, which are considered as adsorbent sites [Carbohydr. Polym., 2016, 151, 1091 incorporated by reference herein in its entirety.]. The graft copolymerization of CS with IA afforded the chitosan with carboxylic groups as repeating units, forming branches as well as others formed by condensation reactions with some amino groups. These groups gave the chitosan the extra adsorption sites towards metal cations. The effect of the contact time of the copolymer with the aqueous solution containing cations was also investigated.

Effect of the Contact Time

The influence of the contact time on the adsorption process of Cu (II) and Zn (II) ions by CS graft IA copolymer is listed in Table 3. The results show that increasing the contact time increased the adsorption capacity till time=2 h. Further increase in the contact time resulted in negligible increase in the cations' adsorption. Thus, the 2 hours' contact time was chosen as desired contact time for the adsorption process.

TABLE 3

| | Polymer used | q (mg/g) at 1 hour | q (mg/g) at 2 hour | q (mg/g) at 3 hour |
|---|---|---|---|---|
| $Cu^{2+}$ | CS | 4.914 | 5.43 | 5.58 |
| (pH = 6.5, at 60° C.) | CS-g-IA (G % = 52.65) | 9.05 | 9.77 | 9.84 |
| $Zn^{2+}$ | CS | 3.11 | 3.43 | 3.5 |
| (pH = 6.5, at 60° C.) | CS-g-IA (G % = 52.65) | 4.5 | 4.89 | 4.92 |

The desired parameters for the removal of $Cu^{2+}$ process was confirmed for pH=6.5, temperature at 60° C. for 2 hours. However, in the case of $Zn^{2+}$ the maximum removal was obtained at pH=6, 60° C. for 2 hours.

X-Ray Diffraction

To confirm the adsorption of Cu cations onto the copolymer matrix, the XRD pattern of the copolymers after removal of Cu (II) ions was studied. The copper sulphate crystals exhibited various peaks in its XRD pattern, the most distinguished peaks appeared at 2θ=14 and 16, 22 and 35 [*Colloid Polym. Sci.*, 2017, 295 (4), 627 incorporated by reference herein in its entirety.]. The XRD patterns of CS-g-IA copolymer, before and after removal of Cu cations are shown in FIG. 12.

Figure 12:
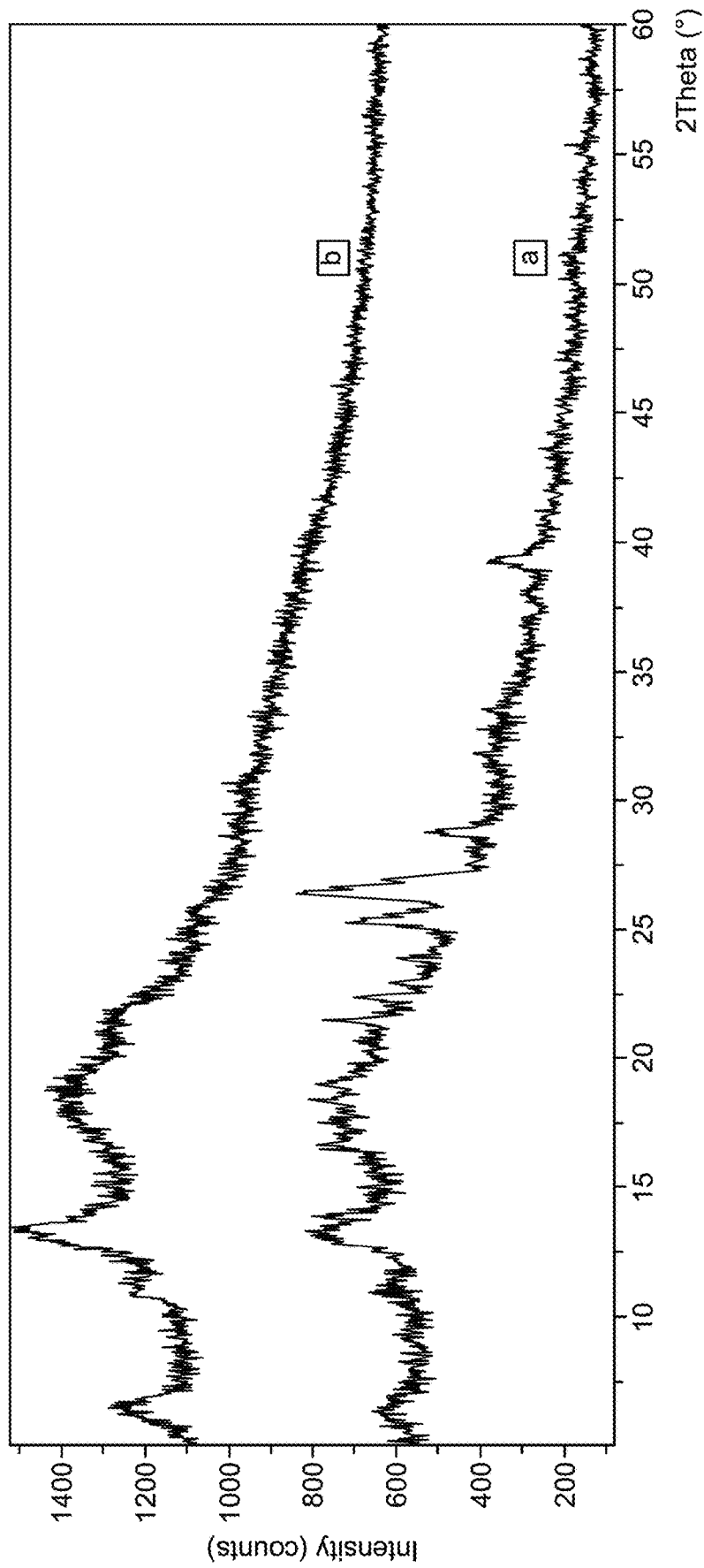
FIG. 12 is a graphical representation depicting X-ray diffraction analysis (XRD) of a CS-g-IA copolymer (G %=52.65%): (a) before removal of Cu (II) ions (b) after the removal of the Cu (II) ions, in accordance with exemplary embodiments of the present disclosure.

Referring to the example of FIG. 12 the chitosan-g-IA copolymer is shown before (a) and after (b) the removal of Cu (II) ions. The appearance of an intense peak at 12-14 and disappearance of peaks at 2θ=22–40 confirmed the scavenging power of the copolymer towards the Cu cations.

Figure 13A:
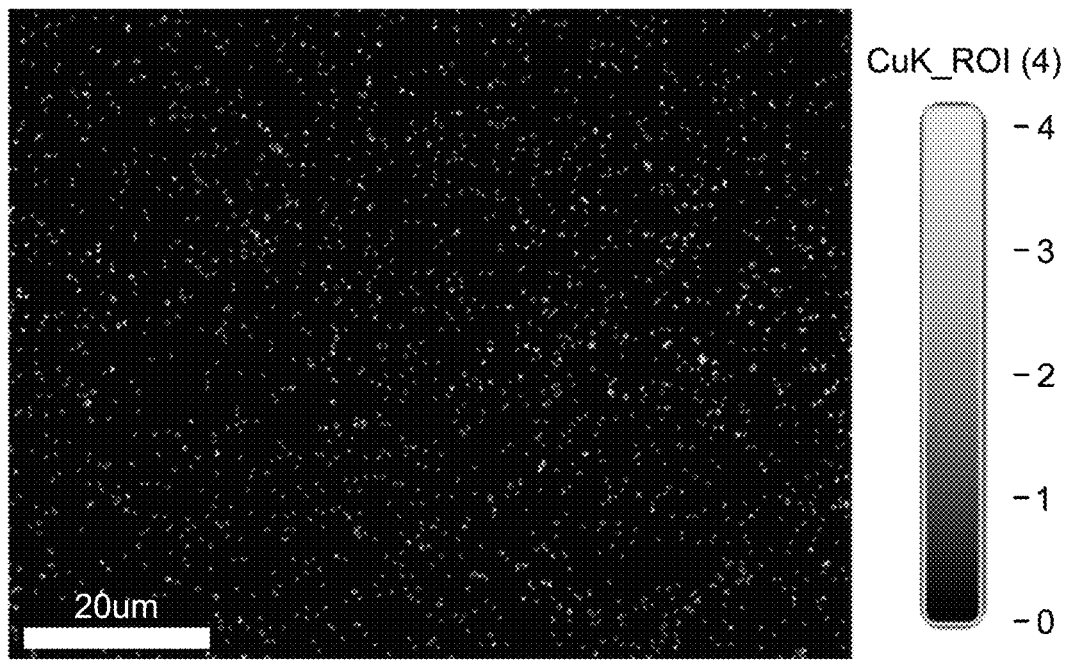
FIG. 13A is a graphical representation depicting energy dispersive X-ray spectroscopy (EDS) of Cu (ions): after treatment with a CS-g-IA copolymer, in accordance with exemplary embodiments of the present disclosure.

Referring to the example of FIG. 13A, the presence of Cu (ions) after the removal process by the synthesized copolymer is demonstrated. The Cu (II) ions inside the CS-g-(IA) copolymer matrix are shown in a different color (grey) from the background (black).

Regeneration of Cu (II) Cations

A determination of the recovery percentage occurred using ICP by measuring the concentration of metal ion in aqueous solution, after the leaching process. The percentage of recovery is calculated according to the following equation.

$C/C_0 \times 100 = $ Recovery (%)

C=Concentration C of Cu ions after desorption process in aqueous solution, for a given $C_0$=Concentration of Cu ions for the sample before desorption process.

Figure 13B:
FIG. 13B is a graphical representation depicting Energy dispersive X-ray spectroscopy (EDS) of Cu (ions): after a regeneration process, in accordance with exemplary embodiments of the present disclosure.
Figure 14:
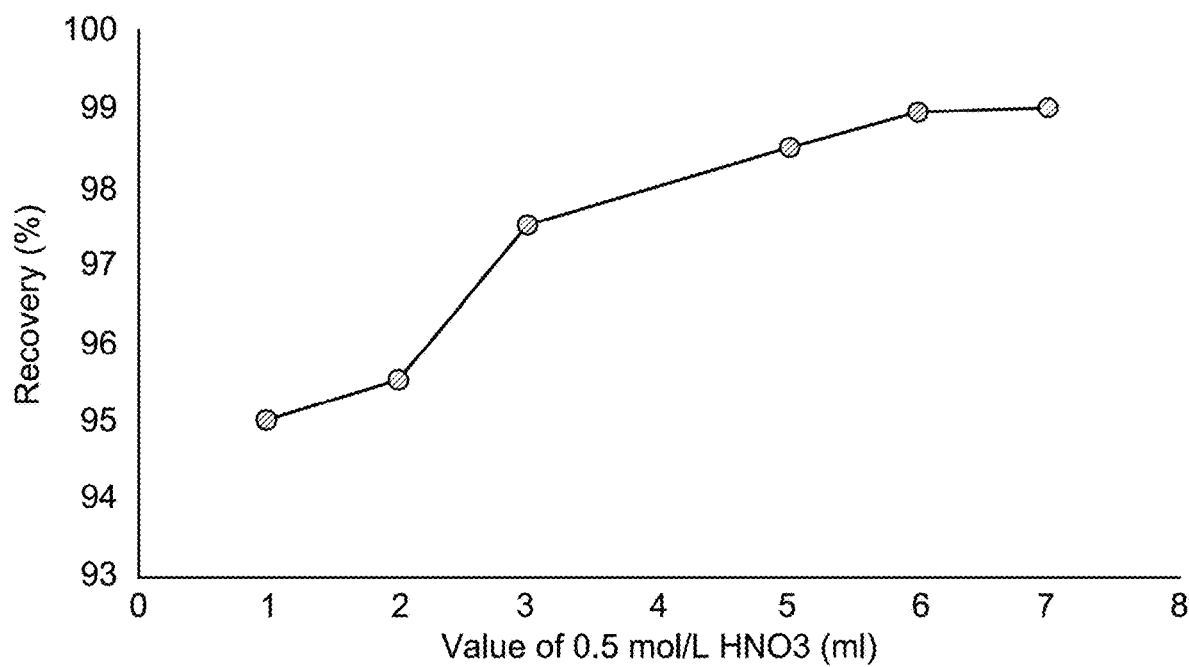
FIG. 14 is a graphical representation depicting recovery percentage as a function of the volume of 0.5 mol/L $HNO_3$, in accordance with exemplary embodiments of the present disclosure.

Referring to the example of FIG. 14, the adsorption of metal ions onto a material or desorption of metal ions from a material is highly sensitive to pH of the medium. Thus, the recovery percentage as a function of the volume of the nitric acid solution was studied. The quantitative recovery (>95%) was obtained in the entire range of the experimental frame as shown in FIG. 14. The maximum recovery was obtained for 5 ml of $HNO_3$ (99.5%). The EDS confirmed the leaching of Cu (II) ions out of the polymeric matrix as shown in FIG. 13 B.

Reusability of the Graft Copolymer as Metal Removal Material

The synthetized copolymer (G %=52.65) was reused four times, after complete desorption and washing with deionized water, the results showed that it can be reused as such without significant loss in its removal efficiency shown in Table 4.

TABLE 4

| State of the nanocomposite film | Fresh film | Recycled film | | | |
|---|---|---|---|---|---|
| | | (1) | (2) | (3) | (4) |
| Efficiency (%) | 95 | 94 | 93 | 92 | 92 |

Desalination

Since the suggested synthesized copolymer was found to act as ion scavenger, desalinizing efficiency towards saline water was investigated. To examine the ability of the graft copolymer to remove salts such as KCl, NaCl from aqueous saline water, the method described in the experimental method above was used.

Figure 15:
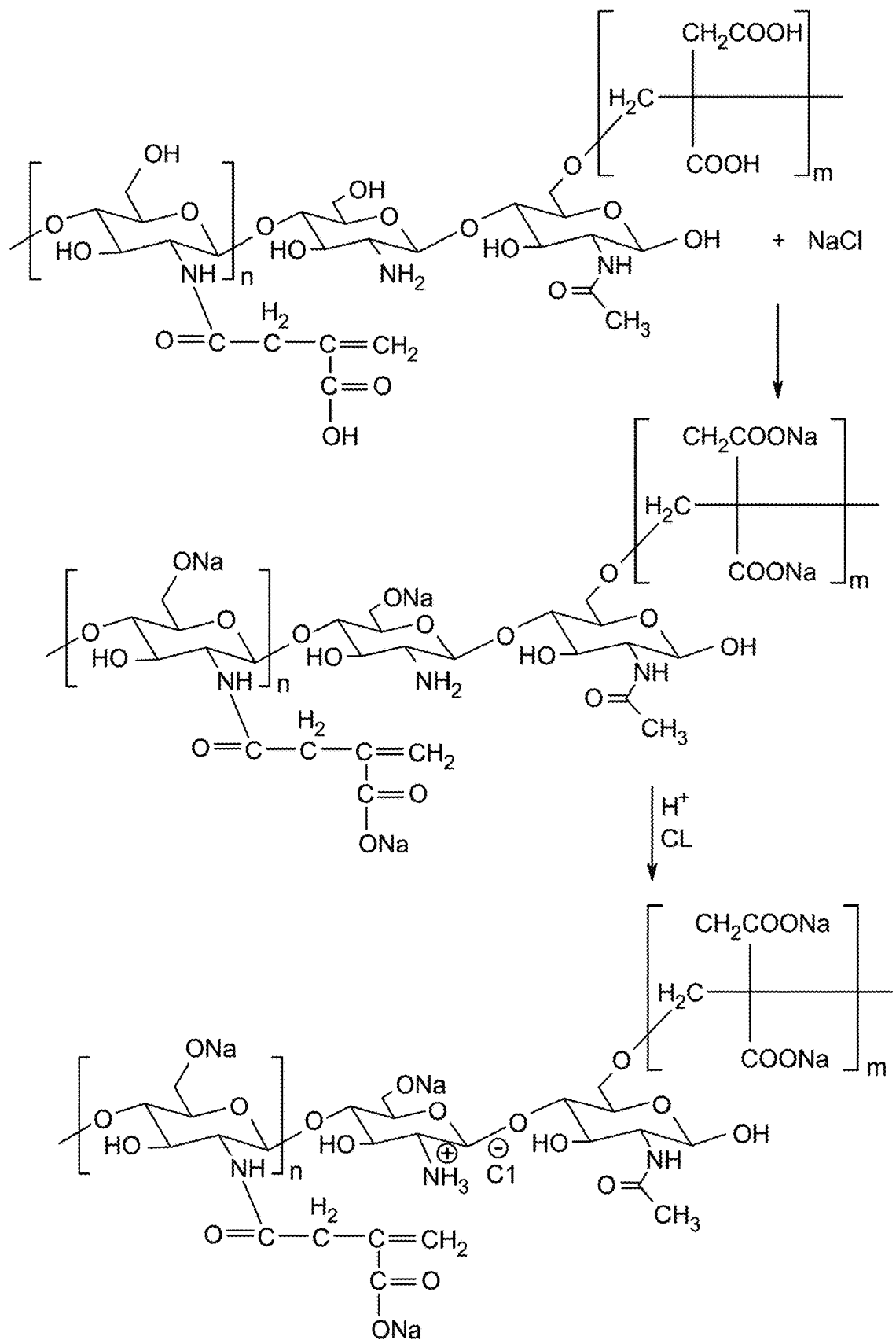
FIG. 15 illustrates a proposed mechanism of NaCl removal by salt bonding to a CS-g-IA nanocomposite according to an exemplary embodiment, in accordance with exemplary embodiments of the present disclosure.
Figure 16A:
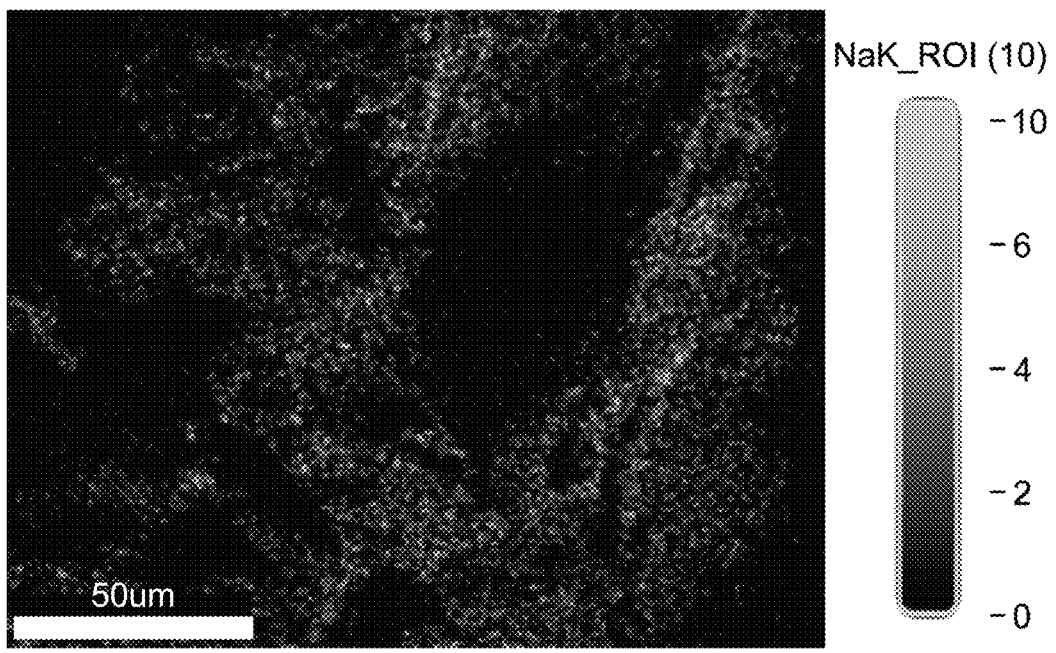
FIG. 16A illustrates morphology of CS-g-IA nanocomposite after removal of NaCl by characterizing the Na cations.
Figure 16B:
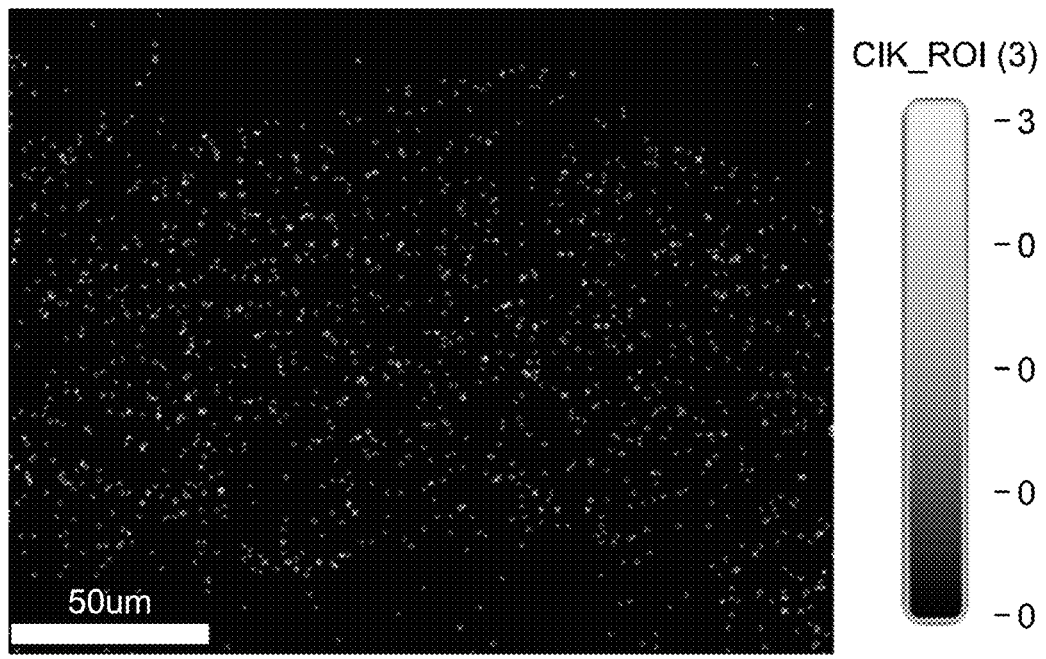
FIG. 16B illustrates morphology of CS-g-IA nanocomposite after removal of NaCl by characterizing the Cl anions.

The results revealed that the CS-g-(IA) exhibited higher removal efficiency for both KCl and NaCl than parent CS did. A proposed mechanism representing the scavenging of NaCl by the CS-g-(IA-DAA) copolymer into its polymeric matrix is illustrated in FIG. 15. The proposed mechanism indicates the ability of the graft copolymer to remove both Na and Cl ions from the saline water. Confirmation of the removal process was observed from the morphology of the graft copolymer after removal of NaCl as shown in the examples of FIG. 16A and FIG. 16B by characterizing the Na cations and the Cl anions respectively using scanning electron microscopy (SEM) with energy-dispersive X-ray analysis (EDX).

Obviously, numerous modifications and variations of the present disclosure are possible in light of the above teachings. It is therefore to be understood that within the scope of the appended claims, the invention may be practiced otherwise than as specifically described herein.

The invention claimed is:

1. A water treatment method for adsorbing metal ions from water, comprising:
   adjusting the pH of the water to from 6 to 7;
   treating the water with a nanocomposite to absorb the metal ion with the nanocomposite and form a polymer-metal ion composite,
   wherein the nanocomposite is in the form of particles comprising aluminum oxide dispersed in a matrix of an uncrosslinked graft copolymer that includes a chitosan backbone and side chains of poly (itaconic acid) grafted to the chitosan backbone, the chitosan backbone having a plurality of amino groups that are acetylated by itaconic acid; and
   removing the polymer-metal ion composite from the water.

2. The method of claim 1, further comprising acidifying the polymer-metal ion composite to remove the metal ion from the polymer-metal ion composite and regenerate the nanocomposite.

3. The method of claim 2, further comprising
treating the water with the nanocomposite formed by the acidifying to remove the metal ion from the water.

4. The method of claim 2, wherein the metal ion is $Cu^{2+}$ ion and the acidifying includes mixing the polymer-metal ion composite with nitric acid to remove the $Cu^{2+}$ ion from the polymer-metal ion composite.

5. The method of claim 1, further comprising
forming the uncrosslinked graft copolymer by:
adding sodium bisulfite, potassium persulphate and itaconic acid to chitosan in acetic acid to form a solution;
heating the solution to an elevated temperature for a period of time to form uncrosslinked graft copolymer;
filtering the solution to obtain a crude product comprising the uncrosslinked graft copolymer and unreacted chitosan; and
removing the unreacted chitosan from the crude product by Soxhlet extraction with ethanol to obtain the uncrosslinked graft copolymer.

6. The method of claim 5, wherein:
the sodium bisulfite has a concentration of 0.01-0.03 M in the solution;
the potassium persulphate has a concentration of 0.01-0.03 M in the solution;
the chitosan has a concentration around 0.1 M in the solution;
the itaconic acid has a concentration of 0.1-0.2 M in the solution;
the elevated temperature is in the range of 30-60° C.; and
the period of time is between 1 hour and 6 hours.

7. The method of claim 1, further comprising:
forming the nanocomposite by solution casting a mixture of the uncrosslinked graft copolymer and aluminum oxide nanoparticles.

8. The method of claim 7, further comprising:
dissolving the uncrosslinked graft copolymer in acetic acid to obtain a polymer solution;
adjusting the pH of the polymer solution to the range of 6-7;
adding a suspension of aluminum oxide nanoparticles in water portion-wise to the polymer solution to form the mixture;
stirring the mixture;
casting the mixture onto a carrier substrate; and
drying the cast mixture to form the nanocomposite film.

9. The method of claim 8, wherein the aluminum oxide nanoparticles have an average particle size of less than 50 nm.

10. The method of claim 1, wherein the treating comprises immersing the nanocomposite in the water and shaking the water at an elevated temperature.

11. The method of claim 10, further comprising:
shaking the water between 30° C. and 60° C. at a speed of 100-300 rpm for 1-3 hours.

12. The method of claim 1, wherein the metal ion includes at least one of $Cu^{2+}$ and $Zn^{2+}$.

13. The method of claim 1, wherein the metal ion includes at least one of $Na^+$ and $K^+$.

14. The method of claim 1, wherein the side chains of poly (itaconic acid) are grafted to the chitosan backbone via C6 hydroxyl groups.

15. The method of claim 1, wherein a grafting density of itaconic acid is between 20 wt. % and 60 wt. %, the grafting density including poly (itaconic acid) grafted to the chitosan backbone and the itaconic acid acetylating the plurality of amino groups of the chitosan backbone.

* * * * *